United States Patent

[11] 3,603,438

| [72] | Inventors | Toichi Hashizume;<br>Isao Nagai; Katsuhiko Umeda; Tadaaki Otokuni; Yuji Takahashi, all of Tokyo, Japan |
|---|---|---|
| [21] | Appl. No. | 825,642 |
| [22] | Filed | May 19, 1969 |
| [45] | Patented | Sept. 7, 1971 |
| [73] | Assignee | Nissan Motor Company, Limited<br>Kanagawa-ku, Yokohama, Japan |
| [32] | Priority | June 5, 1968, June 5, 1968, June 5, 1968 |
| [33] | | Japan |
| [31] | | 43/47130, 43/47129 and 43/47128 |

[54] FRICTION CLUTCH FOR AN AUTOMOBILE
4 Claims, 5 Drawing Figs.

[52] U.S. Cl. ............................................. 192/107 C
[51] Int. Cl. ........................................... F16d 13/40, F16d 69/00
[50] Field of Search .................................... 192/107, 107 C; 188/218 A, 216

[56] References Cited
UNITED STATES PATENTS

| 1,571,747 | 2/1926 | Wemp | 192/107 CP |
| 1,804,904 | 5/1931 | Wemp | 192/107 CP |
| 1,928,463 | 9/1933 | Richardson et al. | 192/107 CP X |
| 3,213,988 | 10/1965 | Maurice et al. | 192/107 CP X |
| | | FOREIGN PATENTS | |
| 412,763 | 7/1934 | Great Britain | 192/107 C |
| 872,676 | 7/1961 | Great Britain | 192/107 |

*Primary Examiner*—Allan D. Herrmann
*Attorneys*—Robert E. Burns and Emmanuel J. Lobato

ABSTRACT: A friction clutch for an automobile which is so formed as to permit quick release of a drive portion and driven portion by providing an additional releasing effort therebetween. The friction clutch comprises a drive portion consisting of a flywheel secured to the engine shaft, and a pressure plate, and a driven portion consisting of a friction disk disposed between the flywheel and the pressure plate and a splined hub to which the friction disk is secured and meshed in spline with the input shaft of a transmission wherein the friction disk is formed in such a manner that it has a predetermined angle with a bend formed at its plate with respect to the flywheel.

PATENTED SEP 7 1971 3,603,438

FRICTION CLUTCH FOR AN AUTOMOBILE

This invention relates to a friction clutch for an automobile, and more particularly to an improvement of the friction clutch so formed as to have an additional effort to quickly release the engagement thereof.

The clutch is provided in an automobile for permitting the driver to couple or uncouple the engine and transmission. This is particularly required in such a case that the driver intends to shift the gear in the transmission from one to another forward gear position or into reverse or neutral position in order to interrupt the drive between the engine and the power train including a transmission.

The conventional clutch contains a driven plate or friction disk, a spring arrangement and a pressure plate for pressing this disk tightly against the smooth rear face of the flywheel. The friction disk is splined to the clutch shaft. The splines consist of two sets of teeth, an internal set on the hub of the friction disk and a matching external set on the clutch shaft. They permit the friction disk to slide back and forth along the shaft but force the disk and the shaft to rotate together.

The flywheel, which is attached to the end of the engine crankshaft, rotates when the engine is running. When the clutch is engaged in the coupling position, the friction disk is held tightly against the flywheel by the clutch springs so that it should rotate with the flywheel. This rotary motion is carried through the friction disk and clutch shaft to the transmission.

In order to disengage the clutch, the clutch pedal is pushed down by the foot. This causes the clutch fork to pivot so that the clutch bearing is forced inward. As the bearing moves inward, it operates release levers. The release levers take up the spring pressure and lift the pressure plate away from the friction disk so that the clutch is uncoupled. The friction disk consists of a splined hub and plate assembly to which is attached a series of facings. The splined hub thus slides on the splined shaft when the clutch is disengaged so that it moves away from the flywheel together with the facings attached to the friction disk is relieved from the surface of the flywheel due to the difference of the rotation between the flywheel and the driven portion of the friction disk. In such a state, the facings of the friction disk are engaged with the flywheel in such a manner that the facings are so deformed as to be compressed by the force of the pressure plate with the result that the splined hub moves in the compressed amount of the facings attached to the friction disk, which amount may be approximate 0.1 to 0.3 mm. In order to complete the sufficient disengagement of the clutch, the splined hub should move in such an amount that in addition to the compressed amount of the facings a predetermined gap such as in general approximately 0.5 to 0.8 mm must be provided between the facings of the friction disk and flywheel, and between the facings thereof and pressure plate. However, the conventional clutch does not have the provision of means for disengaging the compressed amount of the facings of the friction disk from the flywheel in addition to the sliding motion of the splined hub resulting that even if the force applied to the pressure plate is relieved upon the disengagement of the clutch there is a delay of the disengagement between the facings of the disk and flywheel in such a time of sum of that the splined hub moves in the compressed amount of the facings and that the hub moves in the predetermined gap between the facings and pressure plate. This causes incomplete disengagement of the clutch. Furthermore, the contacting portion between the splined hub and input shaft of the transmission tends to rust to cause worse disengagement of the clutch.

This invention therefore contemplates to eliminate this and other drawbacks thus far inherent in the conventional friction clutch and it is a primary object of the invention to provide a new and improved clutch which permits quick disengagement of a driven portion and drive portion.

The features and advantages of the present invention will become apparent from the following description taken in conjunction with the accompanying drawings, in which:

FIGS. 3A and 3B are views of embodiments of the present invention.

Figure 1:
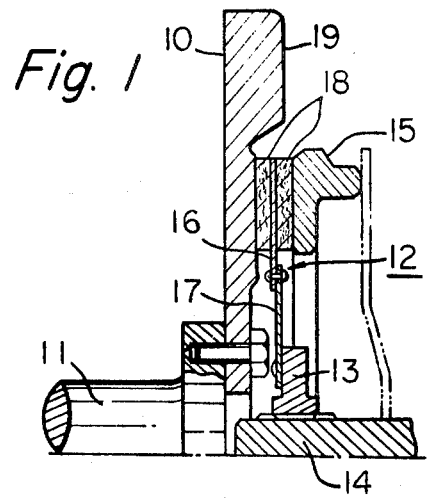
FIG. 1 is a sectional view of a part of a friction clutch assembly.

In FIG. 1, which shows a preferred embodiment of a clutch assembly according to the invention in partial section, the clutch comprises an input member in the form of a flywheel 10 attached to the end of the engine output shaft such as a crankshaft 11, a clutch disk 12 mounted to a splined hub 13 splined to an output member in the form of an input shaft 14 of a transmission (not shown) and disposed between the flywheel 10 and a flexible cushioning plate 16 and a driving or intermediate plate 17 connected with each other, which plate 17 is attached to the splined hub 13 and a plurality of facings or linings 18 attached to both sides of the plate 16, and a pressure plate 15 for pressing the disk 12 tightly against the rear face 19 of the flywheel 10.

Figure 2A:
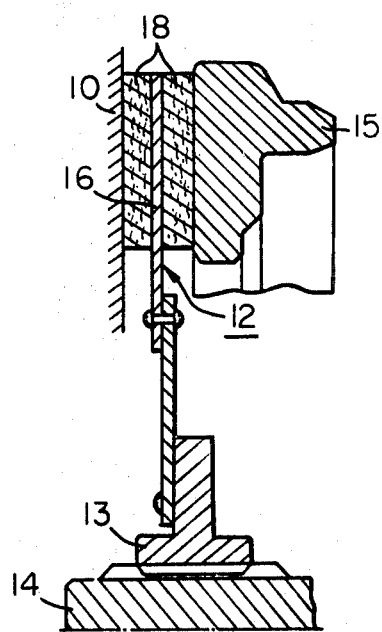
FIGS. 2A and 2B are explanatory views of the engagement and disengagement of the clutch assembly showing the operational principles of the invention.
Figure 2B:
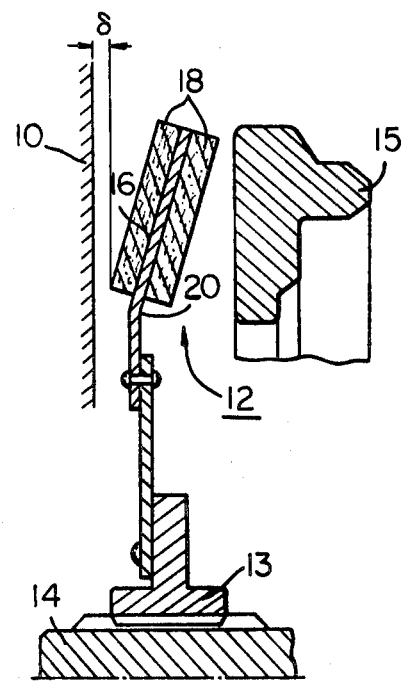

In FIGS. 2A and 2B, the flexible plate 16 is bent or flexed at the portion designated by 20.

When the clutch is engaged as shown in FIG. 2A, pressure plate 15 so that when the clutch is disengaged, the flexible plate 16 attached with the facings 18 on both sides thereof accumulates the resilient energy for moving away the plate 16 from the surface of the flywheel 10. If the plate 16 or 17 is not bent, the splined hub 13 moves in the amount as designated by $\delta$ in FIG. 2B when the clutch is engaged so that the splined hub 13 stops at the position. If the plate 16 or 17 is bent or flexed when the clutch is engaged, the splined hub 13 positively returns back in the same amount as the aforementioned $\delta$ due to the resilient energy of the bent portion of the plate. It follows that even when the clutch is engaged or disengaged the splined hub 13 does not move. Thus, the gap between the surface 19 of the flywheel 10 and the surface of the facings is kept always constant due to the bent portion of the plate.

Embodiments of the present invention will hereinafter be described with reference to FIGS. 3A and 3B.

In FIG. 3A, the clutch disk 12 includes two plates 16 and 17 connected with each other wherein the plate 16 has the facings 18 attached to both sides thereof while the other plate 17 is straight and is attached to the splined hub 13. The intermediate plate 17 of the clutch disk 12 shown in FIG. 3A includes an annular tapered peripheral edge 23 for securing the flexible, annular plate 16 to the plate 17 as having an angle with each other.

The clutch disk 12 shown in FIG. 3B includes a flexible plate 16 having friction facings or linings 18 attached to both sides thereof, and the plate 16 is so secured to the splined hub 13 as to have an angle with respect to the surface 19 of the flywheel 10. The splined hub 13 has an annular tapered peripheral edge portion 24. The embodiments shown in FIGS. 3A and 3B accumulate the energy at the connecting portion of the plates 16 and 17 upon engagement of the clutch.

In addition to the aforementioned effect, when the clutch is coupled to cause the splined hub 13 to move rearward (rightward in FIGS. 2A and 2B), the amount of which almost corresponds to that of the hub 13 designated by $\delta$ in FIG. 2B caused by the compressed amount of the facings 18 attached to both sides of the disk 12 when engaged. This arrangement almost prohibits the movement of the splined hub 13 when disengaged from the engaged state even when the facings 18 attached to the plate 16 is abruptly moved away from the surface 19 of the flywheel 10 by the resilient energy accumulated at the bent portion. Thus, even if the contact portion between the splined hub 13 and input shaft 14 of the transmission is rusted to bond with each other, the quick disengagement of the clutch may be effected thereby since the splined hub 13 does not almost move upon the disengagement of the clutch.

We claim:

1. In combination: a rotatably mounted flywheel mounted for rotation about a longitudinal axis; a pressure plate spaced apart from said flywheel along said longitudinal axis and movable along said axis; a rotatably mounted shaft concentric with said flywheel and pressure plate; a hub splined to said shaft and having an annular tapered peripheral edge portion; a flexible clutch disc having friction facings on both sides thereof; and means connecting said flexible clutch disc at its center portion directly on said edge portion at an angle thereto, said clutch disc having a normal dished configuration and being concave toward said pressure plate when in a state of rest and flexed into a flat condition when gripped between said flywheel and pressure plate to releasably engage said flywheel with said shaft.

2. In combination: a rotatably mounted flywheel mounted for rotation about a longitudinal axis; a pressure plate spaced apart from said flywheel along said longitudinal axis and movable along said axis; a rotatably mounted shaft concentric with said flywheel and pressure plate; a hub splined to said shaft; an annular disc connected to said hub, said annular disc having an annular tapered outer peripheral edge portion; a flexible clutch disc having friction facings on both sides thereof; and means connecting said flexible clutch disc at its center portion to said annular tapered outer peripheral edge portion at an angle thereto, said clutch disc having a normal dished configuration and being concave toward said pressure plate when in a state of rest and flexed into a flat condition when gripped between said flywheel and pressure plate to releasably engage said flywheel with said shaft.

3. A quick-release friction clutch assembly comprising: a rotationally driven input member rotatable about a longitudinal axis; a rotatably mounted output member spaced apart from said input member along said longitudinal axis; a friction clutch assembly operable to selectively engage and disengage said output member with said input member comprising a hub splined to said output member, a flexible annular plate having a normal planar configuration and opposed planar sides, connecting means connecting said flexible annular plate to said hub at an angle thereto whereby said flexible plate extends obliquely away from said input member, said connecting means comprising a tapered surface portion peripherally extending around said hub and means attaching said flexible annular plate to said tapered surface portion, and a friction lining attached to each of said planar sides; and means including a friction surface movable towards said input member into frictional engagement with one of said friction linings to effect flexure of said flexible annular plate out of said normal planar configuration followed by frictional engagement of the other of said friction linings with said input member and movable away from said input member to effect positive disengagement of said other friction lining from said input member due to flexure of said flexible annular plate back to its normal planar configuration.

4. A quick-releasing friction clutch assembly comprising: a rotatationally driven input member rotatable about a longitudinal axis; a rotatably mounted output member spaced apart from said input member along said longitudinal axis; a friction clutch assembly operable to selectively engage and disengage said output member with said input member comprising a hub splined to said output member, a flexible annular plate having a normal planar configuration and opposed planar sides, connecting means connecting said flexible annular plate to said hub at an angle thereto whereby said flexible plate extends obliquely away from said input member, said connecting means comprising an intermediate annular plate connected to a peripheral portion of said hub, said intermediate annular plate having a tapered outer peripheral portion, and means attaching said flexible annular plate to said tapered outer peripheral portion, and a friction lining attached to each of said planar sides; and means including a friction surface movable towards said input member into frictional engagement with one of said friction linings to effect flexure of said flexible annular plate out of said normal planar configuration followed by frictional engagement of the other of said friction linings with said input member and movable away from said input member to effect positive disengagement of said other friction lining from said input member due to flexure of said flexible annular plate back to its normal planar configuration.